(12) United States Patent
Adusei et al.

(10) Patent No.: US 7,032,894 B2
(45) Date of Patent: Apr. 25, 2006

(54) FLOW DISTRIBUTOR FOR MONOLITH REACTORS

(75) Inventors: George Y. Adusei, Branchburg, NJ (US); Stephen A. Campbell, Corning, NY (US); Wei Liu, Painted Post, NY (US); Mitchell E. Odinak, Horseheads, NY (US); Shantanu Roy, Painted Post, NY (US)

(73) Assignee: Corning Incorporated, Corning, NY (US)

( * ) Notice: Subject to any disclaimer, the term of this patent is extended or adjusted under 35 U.S.C. 154(b) by 670 days.

(21) Appl. No.: 10/013,008

(22) Filed: Nov. 5, 2001

(65) Prior Publication Data

US 2003/0086844 A1 May 8, 2003

(51) Int. Cl.
*B01F 3/04* (2006.01)
(52) U.S. Cl. .................. 261/97; 261/103; 422/190; 422/220; 422/222
(58) Field of Classification Search ............ 261/97, 261/103, 106, 110; 422/190, 195, 211, 220, 422/222
See application file for complete search history.

(56) References Cited

U.S. PATENT DOCUMENTS

| | | | | |
|---|---|---|---|---|
| 2,490,080 A | * | 12/1949 | Melvill | 261/97 |
| 4,471,821 A | * | 9/1984 | Coulon et al. | 141/286 |
| 4,788,040 A | * | 11/1988 | Campagnolo et al. | 422/220 |
| 4,808,350 A | * | 2/1989 | Robbins et al. | 261/96 |
| 5,013,492 A | | 5/1991 | Gay et al. | |
| 5,063,043 A | | 11/1991 | Bengtsson | |
| 5,122,310 A | | 6/1992 | Ghelfi et al. | |
| 5,173,173 A | | 12/1992 | Vauk | |
| 5,211,918 A | | 5/1993 | Harle | |
| 5,506,364 A | | 4/1996 | Martin et al. | |
| 5,788,949 A | | 8/1998 | O'Brien | |
| 5,980,838 A | | 11/1999 | von Hippel et al. | |
| RE36,577 E | * | 2/2000 | Jeannot et al. | 62/643 |
| 6,560,990 B1 | * | 5/2003 | Hayashida et al. | 62/625 |
| 6,824,749 B1 | * | 11/2004 | Leloup et al. | 422/220 |
| 2003/0086845 A1 | * | 5/2003 | Adusei et al. | 422/222 |
| 2004/0247501 A1 | * | 12/2004 | Adusei et al. | 422/211 |

OTHER PUBLICATIONS

Edvinsson, R. K., et al. "A comparison between the monolithic reactor and the trickle-bed reactor for liquid-phase hydrogenations," Catalysis Today, 24 (1995), pp. 173-179.
Lebens, P. J., et al., "Hydrodynamics of gas-liquid countercurrent flow in internally finned monolithic structures," Chemical Engineering Science, 52 (1997), pp. 3893-3899.

(Continued)

*Primary Examiner*—Scott Bushey
(74) *Attorney, Agent, or Firm*—Kees van der Sterre

(57) ABSTRACT

A device for distributing fluid into a monolith bed includes a plurality of flow channels stacked in order of decreasing diameter. The flow channels successively split a flow stream into a multiple flow streams prior to the flow stream entering the monolith bed.

8 Claims, 7 Drawing Sheets

OTHER PUBLICATIONS

Satterfield et al., "Some Characteristics of Two-Phase Flow in Monolithic Catalyst Structures", Ind. Eng. Chem., Fundam., vol. 16, No. 1, 1977, pp. 61-66.

Kawakami et al., "Performance of a Honeycomb Monolith Bioreactor—Gas-Liquid-Solid Three-Phase-System", Ind. Eng. Chem. Res., vol. 28, No. 4, 1989, pp. 394-400.

Shiraishi et al., "Characterization of Production of Free Gluconic Acid by Gluconobacter suboxydans Adsorbed on Ceramic Honeycomb Monolith", Biotechnology and Bioengineering, vol. 33, May 1989. pp. 1413-1418.

* cited by examiner

FLOW DISTRIBUTOR FOR MONOLITH REACTORS

BACKGROUND OF INVENTION

1. Field of the Invention

The invention relates to multiphase reactors and to a device and method for distributing fluid into a monolith bed.

2. Background Art

Monoliths contain a large number of thin, parallel, straight channels through which fluids, i.e., gas and liquid, can flow. Typically, the channel shape of the monolith is cylindrical. The number of channels in relation to the cross-sectional area of the monolith is referred to as cell density. The cross-section of the channels can be of any arbitrary shape, such as square, rectangular, triangular, hexagonal, circular, etc. Longitudinal fins may also be incorporated in the walls of the channels to increase the surface area of the channels. Monoliths are typically extruded from a ceramic material such as cordierite but may also be manufactured from metal. The walls of the monolith channels may be coated with a porous washcoat containing an active catalyst. Alternatively, an active catalyst may be incorporated into the walls of the monolith channels. In operation, fluids containing reactants flow through the monolith channels. The reactants react in the presence of the active catalyst, and the products of the reaction are transported out of the monolith channels.

Monolithic catalysts are well-known for their use as three-way catalytic converters in automobiles. Their low pressure drop for gas-phase reactions allow them to be placed directly into the exhaust pipe of an automobile without affecting the performance of the engine. Monolithic catalysts are also widely used for cleaning of industrial flue gas. In recent years, monolithic catalysts have been proposed as alternatives to randomly packed pellets in multiphase reactions, e.g., gas-liquid catalytic reactions such as hydrogenation and hydrotreating. One advantage of monolith catalyst beds over random packed beds with conventional catalyst pellets is increased contact efficiency between the reactants and the catalytic layer. Monolith catalysts can be used in both co-current and countercurrent reactor flow configurations, where the reactor flow configuration is determined by the specific reaction processes.

In any multiphase reaction involving a solid catalyst bed, uniform distribution of fluids into the bed is crucial to achieving high process efficiency. Current commercial-scale liquid distributors for trickle flow reactors and other multiphase applications involving random packed beds of catalyst have very low drip point densities, typically less than 330 drip points per square meter, and yet these drip point densities are considered adequate for these applications due to the inherent interconnected interstitial spaces in a random packed bed. Such distributors with each drip point typically covering a minimum area of 4.5 in$^2$ would be inadequate for monolith catalyst beds in practical applications. This is because monolithic catalysts have many small nearly-independent flow channels per cross-sectional area, typically 50 to 600 channels per square inch of cross-sectional area (cpsi). As an example, a 100 cpsi monolith packing has 450 channels in a 4.5 in$^2$ area. A single drip point covering a minimum area of 4.5 in$^2$ would not be able to uniformly distribute fluid into the 450 individual channels in the 4.5 in$^2$ area.

SUMMARY OF THE INVENTION

In one aspect, the invention relates to a device for distributing fluid into a monolith bed which comprises a plurality of flow channels stacked in order of decreasing diameter. The flow channels successively split a flow stream into smaller flow streams prior to the flow stream entering the monolith bed.

In another aspect, the invention relates to a device for distributing fluid into a monolith bed which comprises a stack of monolith segments. The monolith segments have different cell densities and are stacked in order of increasing cell density so as to successively split a flow stream into smaller flow streams prior to the flow stream entering the monolith bed.

In one aspect, the invention relates to a flow distributor for use in a reactor having a monolith bed. The flow distributor comprises a stack of monolith segments having a plurality of channels that allow flow through the stack. The monolith segments have different cell densities and are stacked in order of increasing cell density. The flow distributor further includes a mechanism for distributing fluid into the monolith segment having the lowest cell density.

In another aspect, the invention relates to a flow distributor for use in a reactor having a monolith catalyst bed. The flow distributor comprises a stack of monolith segments having a plurality of channels that allow flow through the stack. The monolith segments have different cell densities and are stacked in order of increasing cell density. The flow distributor further includes a packed bed for distributing fluid into the channels in the stack and means for distributing fluid into the packed bed.

In another aspect, the invention relates to a chemical reactor having a monolith catalyst bed disposed therein. The chemical reactor comprises a stack of monolith segments mounted at an inlet end of the monolith catalyst bed. The monolith segments have a plurality of channels that allow flow through the stack into the monolith catalyst bed. The monolith segments have different cell densities and are stacked in order of increasing cell density, with the monolith segment having the highest cell density mounted adjacent to the inlet end of the monolith catalyst bed.

In another aspect, the invention relates to a method for distributing fluid into a monolith bed. The method comprises passing the fluid through a flow column having a plurality of channels stacked in order of decreasing diameter, wherein the flow column successively splits the fluid into multiple flow streams. The method further includes allowing the multiple flow streams to enter the monolith bed.

Other features and advantages of the invention will be apparent from the following description and the appended claims.

DETAILED DESCRIPTION

Embodiments of the invention provide a device for distributing fluids uniformly into a monolith bed. Specific embodiments of the invention are described below with reference to the accompanying drawings. In the following description, numerous specific details are set forth in order to provide a more thorough understanding of the invention. However, it will be apparent to one of ordinary skill in the art that the invention may be practiced without these specific details. In other instances, well-known features have not been described in detail to avoid obscuring the invention.

Figure 1:
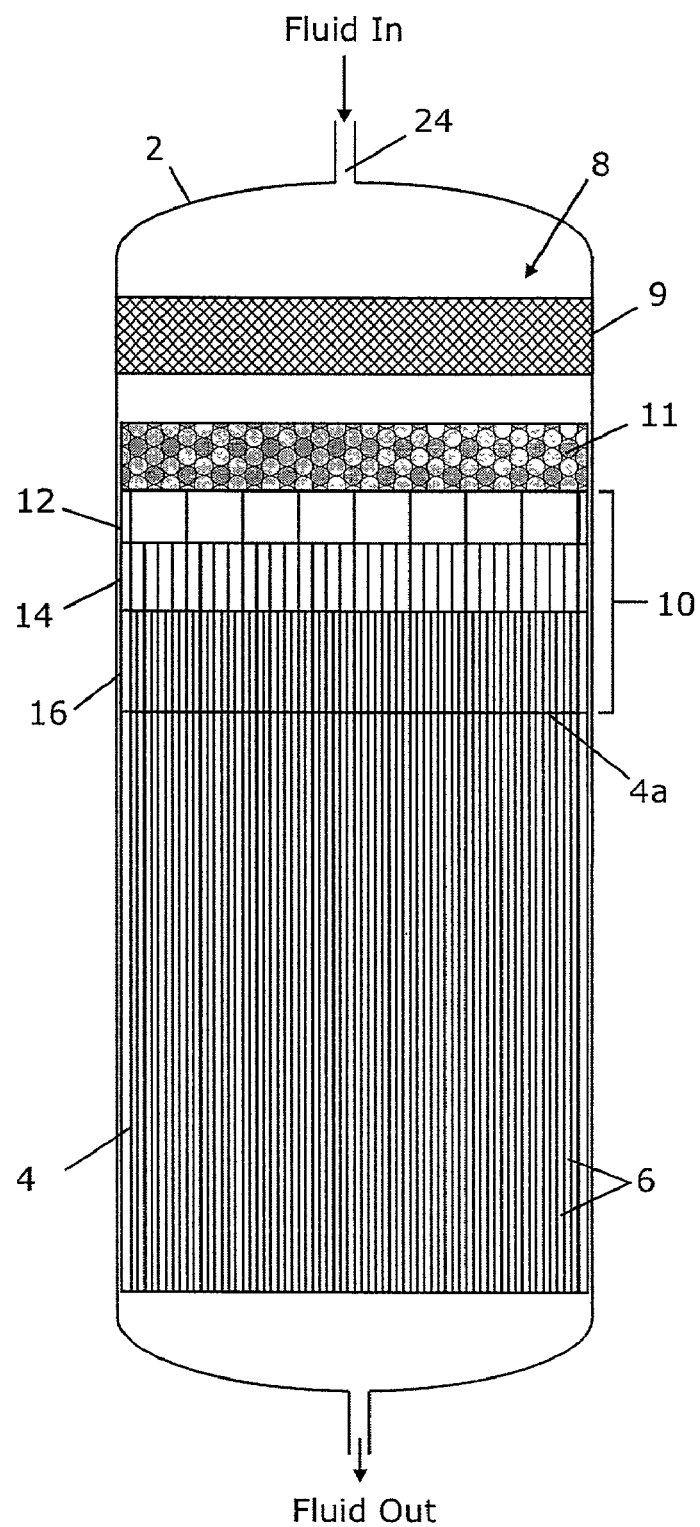
FIG. 1 shows a device for distributing fluid uniformly into a monolith bed.

FIG. 1 shows a reactor 2 containing a monolith bed 4. The monolith bed 4 has a plurality of channels 6 through which a fluid can flow. The walls of the monolith channels 6 may be coated with a porous oxide (washcoat) containing catalytic species, or catalytic species may be incorporated directly into the walls of the monolith channels 6. Longitudinal fins (not shown) may also be incorporated in the walls of the channels 6 to increase the surface area of the channels 6. The reactor 2 may be operated in co-current or counter-current flow. In co-current operation, gas and liquid flow in the same direction through the channels 6. In countercurrent operation, liquid flows down as a wavy falling film on the wall of the monolith channels 6 while gas travels up through the core of the channels 6.

In accordance with one embodiment of the invention, a device 8 for distributing fluid uniformly into the monolith bed 4 includes a mechanical distributor 9. The mechanical distributor 9 may be a sparger pipe, sieve tray, trough, picket-fence weir, bubble cap, spray nozzle, shower head, overflow tube type, or other designs similar to commercial types used for random packed beds and having a reasonable drip point density. Typically, the mechanical distributor 9 would have drip point orifices large enough to minimize plugging.

The device 8 further includes a monolith stack 10 positioned below the mechanical distributor 9. The monolith stack 10 is made up of multiple monolith segments, e.g., monolith segments 12, 14, and 16. Each monolith segment has a plurality of channels through which fluids can flow. It should be noted that the drawing of FIG. 1 is not to scale. Typically, the monolith bed 4 is many times longer than the monolith stack 10. The monolith segments in the monolith stack 10 are typically not catalyzed, although they could be if desired. The monolith stack 10 splits a flow stream from the mechanical distributor 9 into multiple sub flow streams, thus effectively increasing the drip point density of the mechanical distributor 9 and allowing the fluid to be uniformly distributed into the monolith bed 4.

A packed bed 11 is interposed between the mechanical distributor 9 and the monolith stack 10 to divide the fluid from the mechanical distributor 9 into smaller flow streams, which then get split further by the monolith stack 10 into even smaller flow streams. The packed bed 11 also doubles up as a filter medium that removes particulate materials that could otherwise plug the channels in the monolith stack 10. Typically, the top of the packed bed 11 is spaced a distance from the fluid exit points of the mechanical distributor 9. The packed bed 11 may make contact with the monolith stack 10 as shown in the figure. Alternatively, it may be desirable to place a screen or other barrier between the packed bed 11 and the monolith stack 10 to prevent particles in the packed bed 11 from falling into the channels in the monolith stack 10.

The packed bed 11 may be filled with catalyst pellets or inert particles or distillation packing, such as saddles or rings. The ratio of the diameter of the reactor 2 to the diameter of the pellets or packing in the packed bed 11 is typically greater than 5. The smaller the pellet sizes, the better the fluid distribution expected. However, pressure drop increases with decrease of pellet or packing size. The ratio of the height of the packed bed 11 to the pellet or packing size is typically greater than 10.

Figure 2A:
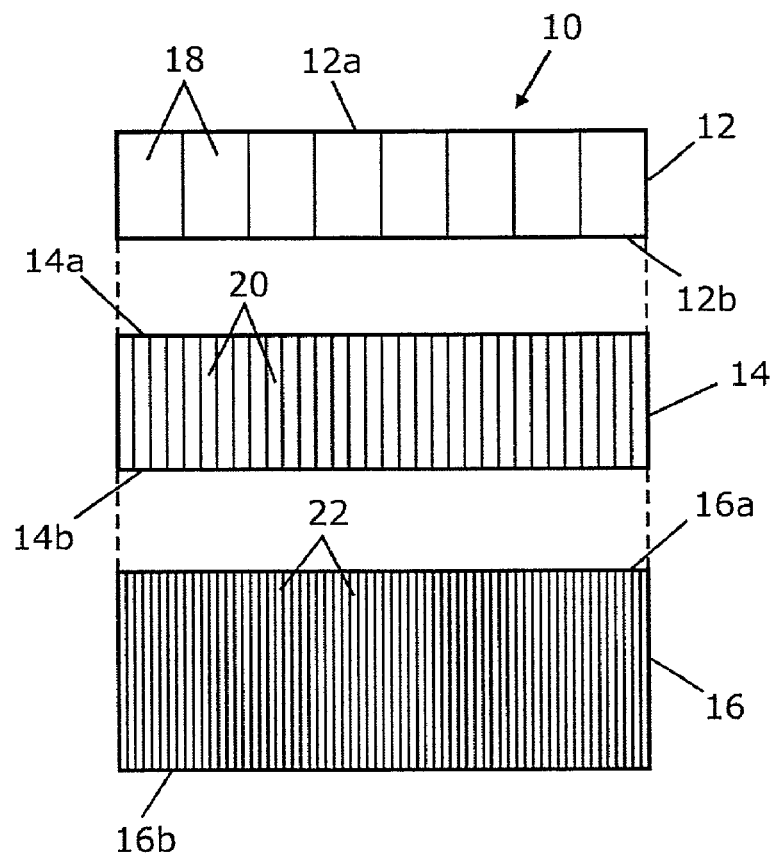
FIG. 2A shows an enlarged (unassembled) view of the monolith stack of FIG. 1.

FIG. 2A shows an enlarged view of the monolith stack 10 in an unassembled state. The monolith stack 10 is shown as having three monolith segments 12, 14, and 16. In general, the monolith stack 10 may have two or more monolith segments. The cell density of the monolith stack 10 increases along the length of the stack, from the top to the bottom of the stack. In order words, the monolith segments 12, 14, 16 have different cell densities, with the monolith segment 12 at the top of the stack 10 having the lowest cell density and the monolith segment 16 at the bottom of the stack 10 having the highest cell density. Preferably, the increase in cell density along the length of the monolith stack 10 is gradual. Also, the monolith segment 16 at the bottom of the stack 10 should have a similar or higher cell density in comparison to the monolith bed (4 in FIG. 1).

The monolith segments 12, 14, 16 have channels 18, 20, 22, respectively. The cross-section of the channels 18, 20, 22 can be of any arbitrary shape. Channel diameter decreases along the length of the monolith stack 10. That is, the hydraulic diameter of the channels 14 is smaller than the hydraulic diameter of the channels 12, and the hydraulic diameter of the channels 16 is smaller than the hydraulic diameter of the channels 14. In operation, fluid flowing down the channels 18 is split into multiple streams at the interface between the monolith segments 12 and 14. The streams enter the channels 18 and are further split into multiple streams at the interface between the monolith segments 14 and 16.

Figure 2B:
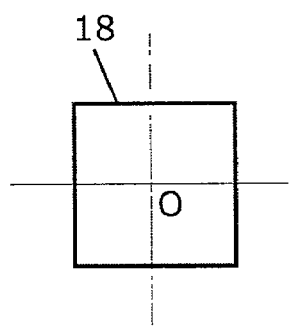
FIG. 2B shows a square cell centered about an origin O.
Figure 2C:
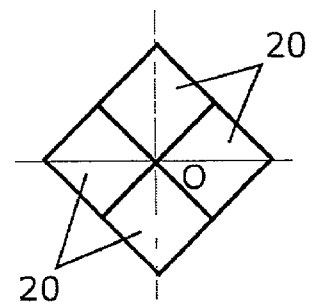
FIG. 2C shows square cells rotated 45 degrees about an origin O.

The monolith segments 12, 14, 16 may be stacked such that there is a relative angular rotation between the channels (or cells) 18, 20, 22 of the monolith segments 12, 14, 16, respectively. FIG. 2B shows a cell 18 of the monolith segment (12 in FIG. 2A) centered about an origin O, and FIG. 2C shows cells 20 of the monolith segment (14 in FIG. 2A) rotated 45 degrees about the origin O. (It should be noted that the invention is not restricted to square cells.) When the cell 18 is stacked on top of the cells 20, the relative angular rotation between the cells 18, 20 is 45 degrees. In general, the relative angular rotation between stacked cells is dependent on the properties of the fluid flowing through the monolith stack 10 and the flow rates under consideration. Some angular rotation between stacked cells is generally encouraged to allow fluid mixing at the interfaces between the stacked cells.

The surfaces 12b, 14a and 14b, and 16a of the monolith segments 12, 14, and 16, respectively, can be made flat so that adjacent monolith segments are in full contact when the monolith stack 10 is in an assembled state. (The monolith stack 10 is shown in an assembled state in FIG. 1.) The surface 16b of the monolith segment 16 at the bottom of the stack 10 may also be made flat so that it is in full contact with the inlet end (4a in FIG. 1) of the monolith bed (4 in FIG. 1) when the monolith stack 10 is mounted on the monolith bed (4 in FIG. 1). The surface 12a of the monolith segment 12 at the top of the stack 10 may also be made flat so that it can make full contact with the packed bed (11 in FIG. 1). The lengths of the monolith segments 12, 14, 16 may be made the same or different, depending on the properties of the fluids flowing through the monolith stack 10 and the flow rates under consideration.

Returning to FIG. 1, one or more fluids are supplied to the mechanical distributor 9 through a port 24 in the reactor 2. In co-current operation, for example, a gaseous reactant and a liquid reactant can be supplied to the mechanical distributor 9 through the port 24. The mechanical distributor 9 distributes the fluid (or fluids) uniformly onto the surface of the packed bed 11. The fluid percolates the packed bed 11 and is divided into smaller streams by the packed bed 11. The smaller streams flow down the monolith stack 10, are successively split into sub flow streams, and are distributed into the channels 6 in the monolith bed 4. As the fluid flows down the monolith stack 10, fluid interaction at the interface between adjacent monolith segments in the monolith stack 10 enhances fluid mixing before the fluid enters the channels 6 in the monolith bed 4.

Figure 3:
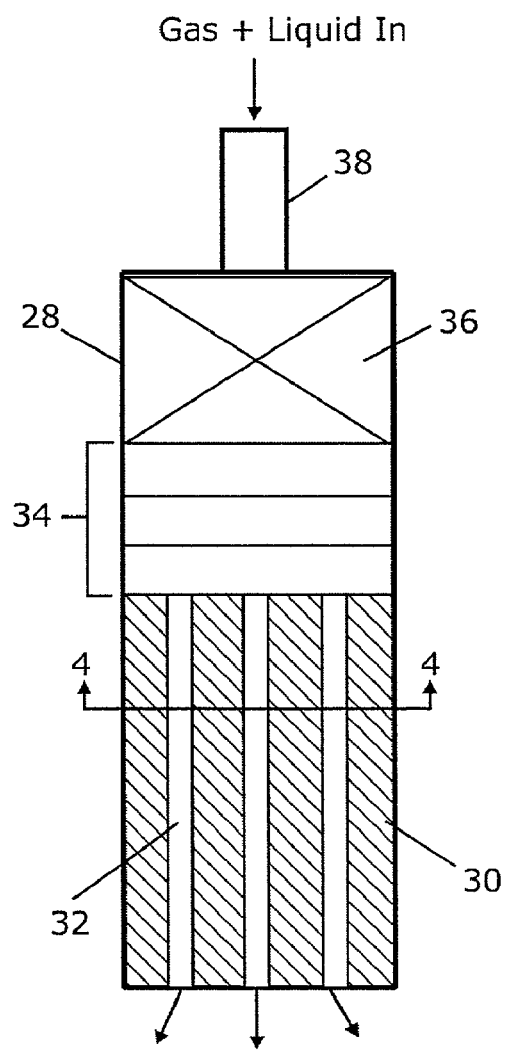
FIG. 3 is a setup for obtaining flow distribution profile across a monolith bed.
Figure 4:
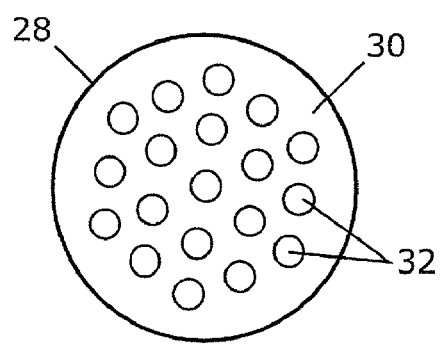
FIG. 4 is a cross-section of the monolith bed shown in FIG. 3.

Cold flow experiments were performed with air as the gas phase and water as the liquid phase to illustrate the effect of different bed packing methods on flow distribution profile across the monolith bed. The experiments were performed under ambient conditions. FIG. 3 shows the cold flow experimental setup. The testing was performed with a reactor tube 28 having an inner diameter of 1.0 cm. Inside the reactor tube 28 was a monolith catalyst bed 30. The monolith catalyst bed 30 had an outer diameter of 1.0 cm and 19 circular channels 32, each channel having a diameter of 1.0 mm. (A horizontal cross-section of the monolith catalyst bed 30 is shown in FIG. 4). The circular channels 32 were uniformly distributed across the cross-sectional area of the monolith bed 30. A monolith stack 34 and a packed bed 36 are mounted above the monolith bed 30.

Gas and liquid are introduced into the reactor tube 28 through a ¼-in feed tube 38 having an inner diameter of 3 mm. The feed tube 38 is located at the top center of the reactor tube 28. As a result, the bulk gas and liquid stream flow down through the packed bed 36 and get divided into a number of smaller streams by the monolith stack 34. The smaller streams enter the channels 32 of the monolith bed 30. The liquid flow emanating from the bottom of each channel 32 in the monolith bed 30 is collected over a period of time, e.g., 2 minutes. In this way, the flow rates of the liquid passing through the individual channels 32 were obtained. The total liquid collected from all the channels 32 was verified for mass balance by comparing with the total flow rate feed into the monolith bed 30.

The flow distribution across the cross-section of the monolith bed 30 was measured at different gas and liquid flow rates. The liquid flow rates were chosen such that the superficial liquid linear velocity inside the reactor tube 28 are similar to the ones used in a commercial trickle bed reactor. It was observed that the distribution profile was significantly affected by the distribution method used, i.e., the configuration of the monolith stack 34 and the packed bed 36. In some cases, the liquid came out of only a few monolith channels 32, leaving the other channels dry. No significant pressure drop, compared to the scale of measurement used for the entire monolith bed 30, was observed with the distribution methods under the flow rates tested.

The different distributors and different conditions were evaluated on an equivalent basis based on simple criteria. The dimensionless variance in liquid flow is defined as follows:

$$DIMVAR(Q) = \frac{VAR(Q)}{Q_{mean}^2} \qquad 1$$

where Q is liquid flow through an individual channel, $Q_{mean}$ is the mean liquid flow through N channels, and VAR(Q) is the variance in the liquid flow through N channels. The mean liquid flow is defined as $$Q_{mean} = \frac{1}{N} \sum_{i=1}^{N} Q_i \quad i = 1, \ldots, N \qquad 2$$

and the variance in the liquid flow is defined as:

$$VAR(Q) = \frac{1}{N-1} \sum_{i=1}^{N} (Q_i - Q_{mean})^2 \quad i = 1, \ldots, N \qquad 3$$

For an ideal (uniform) distribution, the spatial variance of the distribution should be zero so that all the channels have the same liquid (and gas) flow, which is identical to the mean. However, this does not happen in reality. Therefore, the criterion for uniformity is to minimize the variance in the spatial distribution of liquid flow. Because the flow rates are different under different conditions, it is desirable to compare the spatial variance on the same basis. Therefore, the spatial variance is normalized to get the dimensionless spatial variance. The spatial dimensionless variance serves as an index of distribution quality. The spatial dimensionless variance should be as small as possible. The dimensionless range, given by equation (4) below, is also monitored. The dimensionless range indicates the maximum possible deviation of the liquid flow in an individual channel to the mean liquid flow. The dimensionless range should be as small as possible.

$$DIMRange(Q) = \frac{\left[\operatorname*{Max}_{i=1}^{N}(Q_i)\right] - \left[\operatorname*{Min}_{i=1}^{N}(Q_i)\right]}{Q_{mean}} \qquad 4$$

Table 1 shows the raw data from testing of a typical distribution method at different flow conditions. For this typical distribution method, the packed bed (36 in FIG. 3) include trilobe catalyst extrudate having a normal size of 1.3 mm and a length of 4 mm. The length of the packed bed (36 in FIG. 3) was 3 in. The monolith stack (34 in FIG. 3) had three monolith segments having cell densities of 200 cpsi, 400 cpsi, ad 600 cpsi, respectively. Each monolith segment in the monolith stack (34 in FIG. 3) had a length of 1 in.

TABLE 1

Flow rate of individual channels under different flow conditions with monolith stack and trilobes distribution method

| | Liquid (ml/min)/Gas (sccm) | | | |
|---|---|---|---|---|
| Channel # | 5/100 | 15/300 | 30/600 | 40/800 |
| 1 | 0.00 | 2.40 | 0.20 | 8.10 |
| 2 | 1.40 | 3.30 | 2.60 | 1.60 |
| 3 | 1.60 | 0.40 | 9.60 | 3.10 |
| 4 | 0.10 | 0.60 | 0.60 | 2.10 |
| 5 | 0.40 | 0.90 | 4.40 | 4.60 |
| 6 | 0.10 | 1.60 | 0.80 | 3.60 |
| 7 | 0.00 | 1.90 | 5.20 | 13.00 |
| 8 | 0.30 | 1.80 | 10.50 | 5.40 |
| 9 | 4.10 | 0.40 | 2.60 | 3.10 |
| 10 | 0.80 | 6.40 | 1.80 | 4.80 |
| 11 | 0.00 | 7.00 | 2.20 | 2.10 |
| 12 | 2.00 | 0.10 | 2.60 | 4.50 |
| 13 | 3.10 | 3.30 | 9.40 | 1.40 |
| 14 | 0.30 | 0.40 | 0.40 | 4.40 |
| 15 | 0.10 | 0.40 | 2.40 | 3.10 |
| 16 | 0.00 | 0.60 | 0.30 | 7.40 |
| 17 | 0.00 | 0.60 | 0.60 | 9.60 |
| 18 | 0.00 | 0.00 | 5.00 | 5.60 |
| 19 | 1.30 | 2.80 | 6.80 | 2.10 |
| Mean | 0.79 | 1.84 | 3.58 | 4.72 |
| Variance | 1.45 | 4.07 | 11.16 | 9.05 |
| Dim. Var. | 2.29 | 1.21 | 0.87 | 0.41 |
| Max. | 4.10 | 7.00 | 10.50 | 13.00 |
| Min. | 0.00 | 0.00 | 0.20 | 1.40 |
| Dim. Range | 5.16 | 3.81 | 2.88 | 2.46 |

Table 2 shows typical raw data for three different distribution methods at a typical flow condition of liquid flow of 40 ml/min and gas flow rate of 800 sccm. The first distribution method (column 2) includes a monolith stack having cell densities 200 cpsi, 400 cpsi, and 600 cpsi, respectively. Each monolith segment had a length of 1 in. The first distribution method does not include a packing bed. The second distribution method (column 3) includes a monolith stack having cell densities 200 cpsi, 400 cpsi, and 600 cpsi, respectively, and a 3 in. packed bed filled with trilobe catalyst extrudate (nominal size=1.3 mm, 4 mm long). The third distribution method (column 3) includes a monolith stack having cell densities 200 cpsi, 400 cpsi, and 600 cpsi, respectively, and a 3 in. packed bed filled with stainless steel saddle package (0.08 in).

TABLE 2

Flow rate of individual channels with three different distribution methods under identical overall flow conditions

| Channel # | Stacked Monoliths | Stacked Monoliths + Trilobes | Stacked Monoliths + Saddles |
|---|---|---|---|
| 1 | 8.20 | 8.10 | 8.00 |
| 2 | 1.80 | 1.60 | 3.00 |
| 3 | 4.20 | 3.10 | 2.10 |
| 4 | 7.20 | 2.10 | 2.30 |
| 5 | 3.60 | 4.60 | 2.10 |
| 6 | 6.80 | 3.60 | 1.40 |
| 7 | 1.00 | 13.00 | 5.50 |
| 8 | 6.70 | 5.40 | 5.50 |
| 9 | 7.40 | 3.10 | 2.50 |
| 10 | 3.60 | 4.80 | 0.80 |
| 11 | 3.20 | 2.10 | 1.00 |
| 12 | 2.20 | 4.50 | 10.00 |
| 13 | 4.80 | 1.40 | 6.20 |
| 14 | 3.00 | 4.40 | 5.10 |
| 15 | 9.60 | 3.10 | 1.00 |
| 16 | 2.20 | 7.40 | 8.40 |
| 17 | 6.80 | 9.60 | 3.90 |
| 18 | 5.20 | 5.60 | 9.00 |
| 19 | 1.00 | 2.10 | 6.90 |
| Total | 94.50 | 89.60 | 84.70 |
| Total (Calc.) | 80 | 80 | 80 |
| Mean | 4.97 | 4.72 | 4.46 |
| Variance | 6.06 | 9.05 | 8.87 |
| Dim. Var. | 0.25 | 0.41 | 0.45 |
| Max. | 9.60 | 13.00 | 10.00 |
| Min. | 1.00 | 1.40 | 0.80 |
| Dim. Range | 1.73 | 2.46 | 2.06 |

Figure 5:
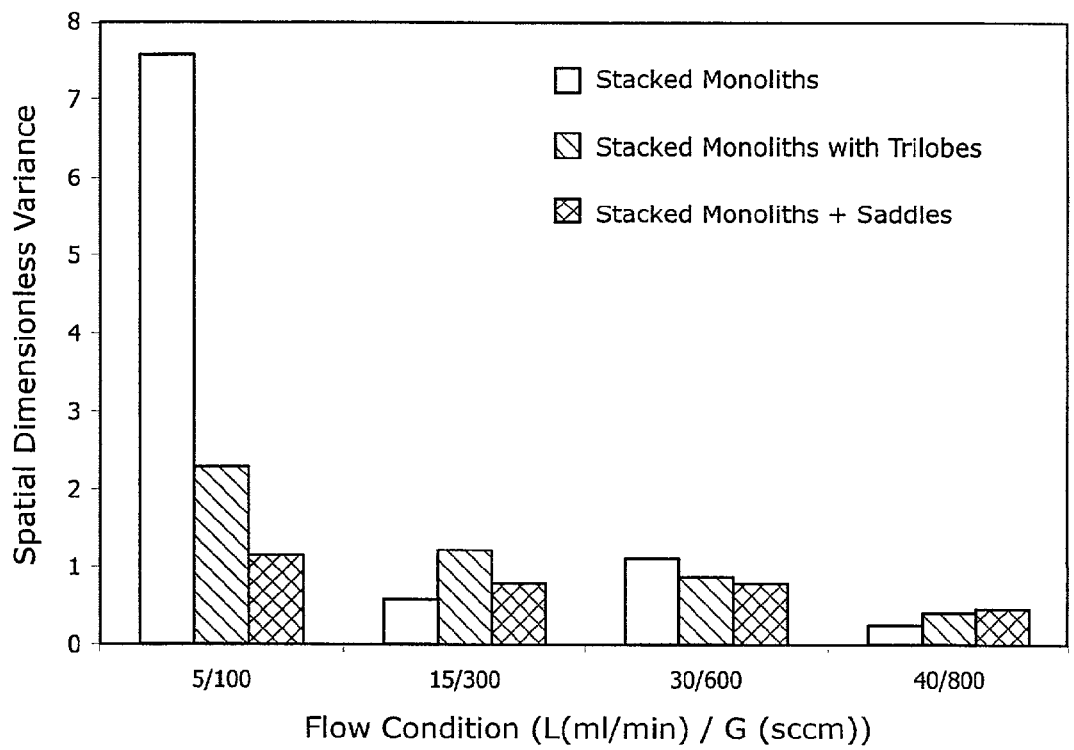
FIG. 5 compares the distribution quality of three different distribution methods.

FIG. 5 compares the distribution quality of the three different distribution methods discussed above. The results show that distribution improves for any given design as the total liquid flow rate increases. This is apparent from the diminishing spatial dimensionless variance. In general, the distribution method with the monolith stack and saddles performed better than the other two distribution methods. The results also demonstrate the usefulness of the monolith stack as an effective gas/liquid distribution device for monolith reactors. It should be noted that the various distribution methods presented above are for illustration purposes only and are not intended to limit the scope of the invention as otherwise described herein.

Figure 6:
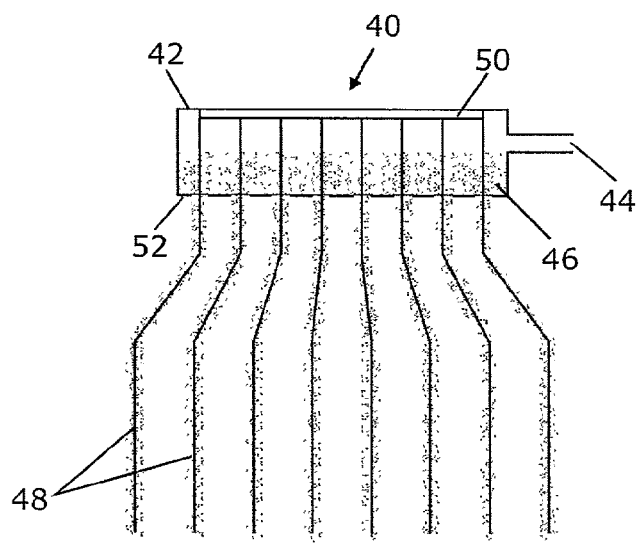
FIG. 6 shows a mechanism for distributing fluid uniformly into a monolith stack.

FIG. 6 shows a mechanism 40 for distributing fluid into the monolith stack (10 in FIG. 1). The mechanism 40 can be used instead of the mechanical distributor (9 in FIG. 1) and the packed bed (11 in FIG. 1). The mechanism 40 includes a guide wire housing 42 having a port 44 through which it can be flooded with a liquid reactant 46. An array of guide wires 48 is connected to a plate 50, which is suspended inside the guide wire housing 42. At the bottom of the guide wire housing 42 is a perforated plate 52. The guide wires 48 pass through the perforations in the perforated plate 52 and extend downwardly. The liquid reactant 46 in the guide wire housing 42 flows along the length of the guide wires 48 via surface tension. The diameters of the perforations in the perforated plate 52 are selected to ensure the proper liquid flow rate as driven by gravity. Alternatively, the guide wire housing 42 may be sealed on top so that the liquid reactant 46 can be pressurized and forced through the perforations in the perforated plate 52 at a higher rate than the gravity-induced flow rate.

Figure 7:
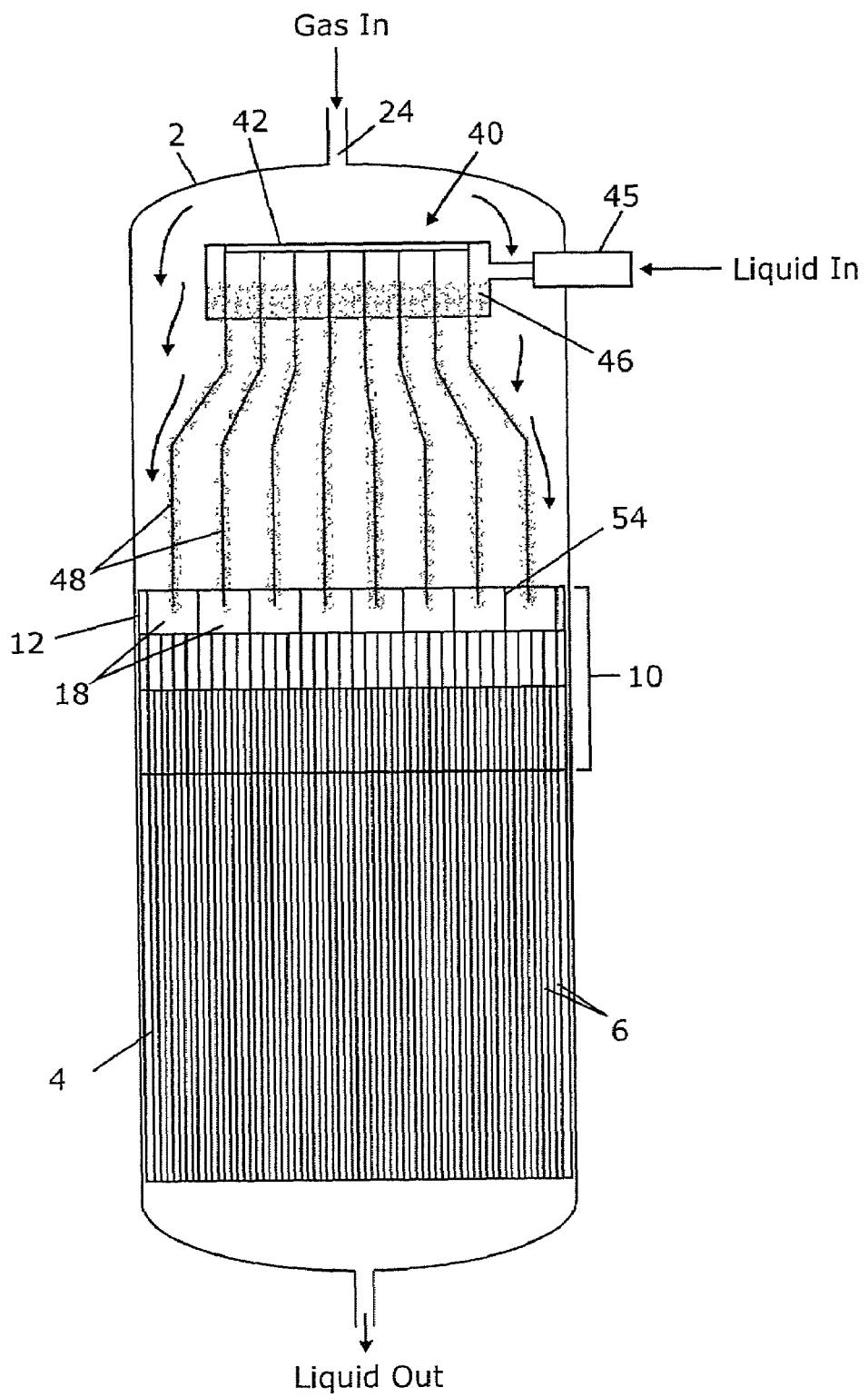
FIG. 7 shows the mechanism of FIG. 6 suspended above a monolith stack.

FIG. 7 shows the mechanism 40 positioned to guide the liquid reactant 46 into the monolith stack 10. In the figure, the guide wires 48 are aligned with the center of each channel 18 of the monolith segment 12 and extend into the channels 18. In an alternate arrangement, the guide wires 48 may stop just above the channels 18 or may be aligned with channel wall intersections 54 instead of the center of the channels 18.

Figure 8:
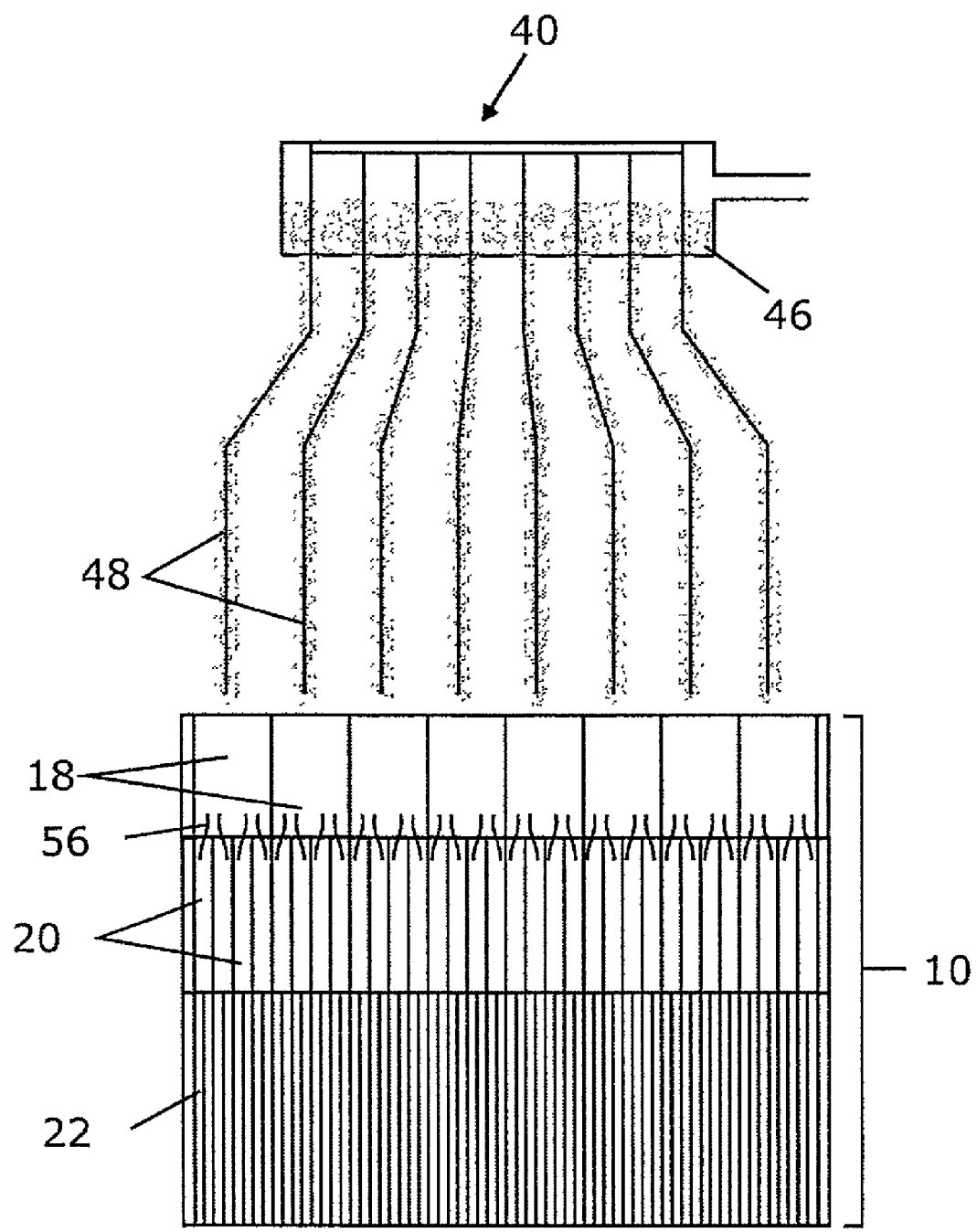
FIG. 8 shows guide wires positioned in an interface between two monoliths segments.

In operation, the guide wire housing 42 is flooded with a liquid reactant 46 from an inlet tube 45. The liquid reactant 46 flows into the stack 10, where it is split into multiple flow streams. The flow streams enter the channels 6 in the monolith bed 4. As illustrated in FIG. 8, guide wires 56 may be included in the interface between adjacent monolith segments to ensure proper division of the falling liquid reactant 46 inside the stack 10. In FIG. 7, a gaseous reactant may be introduced into the reactor 2 through the inlet port 24. The diameter of the guide wire housing 42 is made smaller than that of the reactor 2 so that the gaseous reactant can flow around the guide wire housing 42, as indicated by the arrows, and mix with the liquid reactant 46. The liquid reactant 46 carries the gaseous reactant into the channels 18 in the monolith stack 10.

Figure 9:
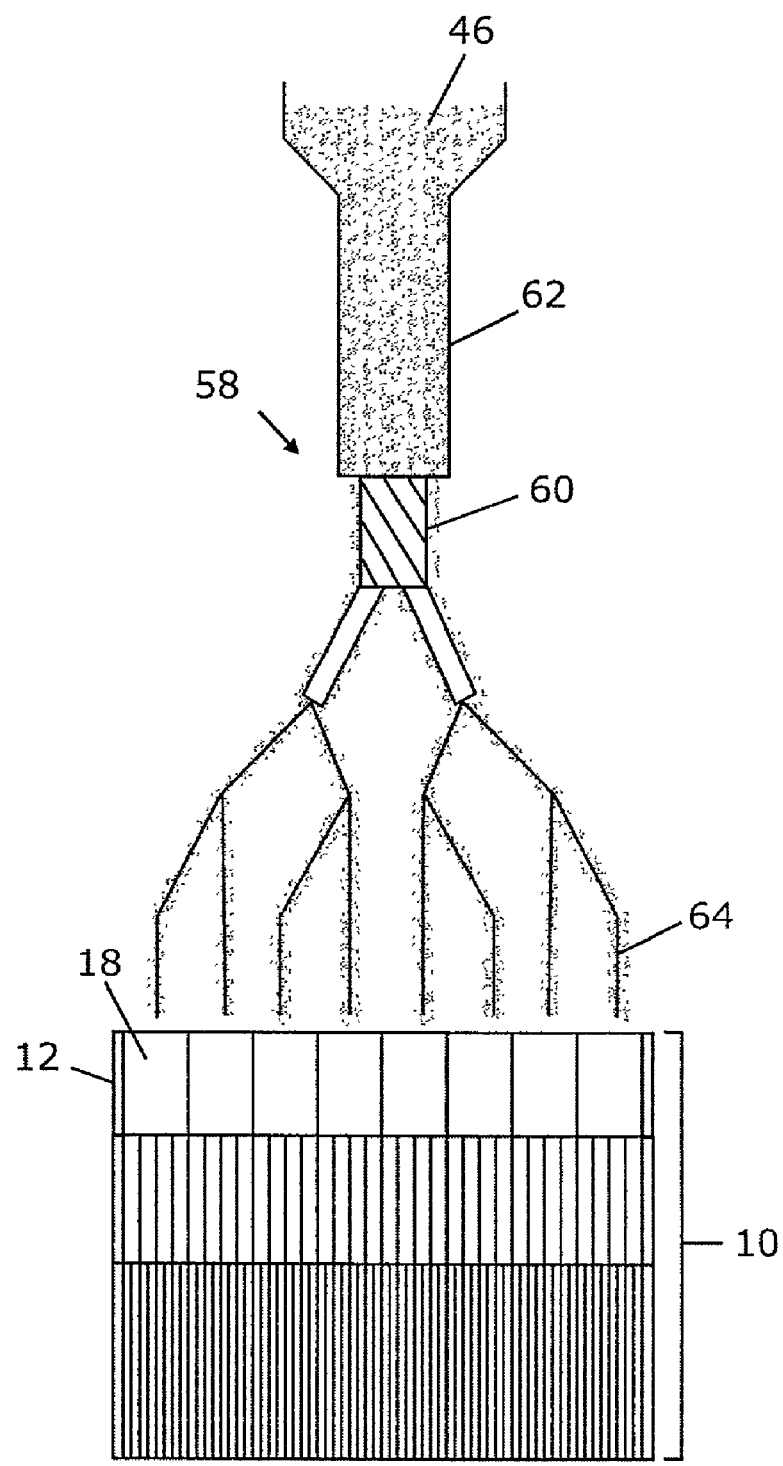
FIG. 9 shows another mechanism for distributing fluid uniformly into a monolith stack.

FIG. 9 shows another mechanism 58 for distributing fluid into the monolith stack (10 in FIG. 1). The mechanism 58 can also be used instead of the mechanical distributor (9 in FIG. 1) and the packed bed (11 in FIG. 1). The mechanism 58 includes a bundle of wires 60 wrapped around each other such that sub-bundles, or individual wires, may branch off from the main bundle. At each split point, the total number of liquid paths increases. The main bundle 60 is hung through a feeder tube 62 that directs feed liquid onto the bundle stem. In operation, the feeder tube 62 is suspended above the monolith stack 10 to direct fluid into the channels 18 of the monolith stack 10. The diameter of the feeder tube 62 is a function of the liquid physical properties and/or the liquid flow rate. When the mechanism 58 is suspended in the reactor (2 in FIG. 6), a gaseous reactant can flow around the feeder tube 62 and mix with the liquid reactant 46 as the liquid reactant 46 flows along the wires 64 into the channels 18 of the monolith stack 10.

The invention provides one or more advantages. The device of the invention allows fluids, i.e., liquid and gas, to be distributed uniformly into a monolith bed, thus allowing high process efficiency. The device distributes fluid uniformly into monolith channels independent of the fluid flow rates and/or the gas-to-liquid ratios.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A device for distributing a liquid flow stream downwardly into a monolith bed, comprising:
    a stack of monolith segments, the monolith segments having different cell densities and stacked in order of increasing cell density in the gravitationally downward direction of liquid flow so as to successively split the liquid flow stream into smaller liquid flow streams prior to the flow stream entering the monolith bed, and
    means for distributing fluid into the monolith stack comprising an array of guide wires extending in said gravitationally downward direction from a perforated housing containing a liquid reactant to guide the liquid reactant into the stack of monolith segments.

2. The device of claim 1, wherein the monolith segment having the highest cell density is adapted to mate with the monolith bed.

3. The device of claim 2, wherein the cell density of the monolith segment adapted to mate with the monolith bed is similar to the cell density of the monolith bed.

4. The device of claim 2, wherein the cell density of the monolith segment adapted to mate with the monolith bed is greater than the cell density of the monolith bed.

5. The device of claim 1, wherein the monolith bed is catalyzed.

6. The device of claim 1, wherein each monolith segment has a plurality of channels and the monolith segments are stacked such that there is a relative angular rotation between the channels in adjacent monolith segments.

7. A flow distributor for use in a reactor having a monolith bed, comprising:
    a stack of monolith segments having a plurality of channels that allow flow through the stack, the monolith segments having different cell densities and stacked in order of increasing cell density;
    a mechanism for distributing fluid into the monolith segment having the lowest cell density, and
    guide members positioned in an interface between the monolith segments having different cell densities to assist in directing fluid between channels in the monolith segments.

8. A flow distributor for use in a reactor having a monolith catalyst bed, comprising:
    a mechanical distributor for a fluid;
    a stack of monolith segments positioned gravitationally below the distributor and having a plurality of channels that allow flow through the stack, the monolith segments having different cell densities and stacked in order of increasing cell density from the top gravitational position the bottom gravitational position of the stack; and
    a packed bed for distributing fluid into the channels in the stack interposed between the mechanical distributor and the monolith stack.

* * * * *